United States Patent [19]
Buhrgard et al.

[11] Patent Number: 5,790,540
[45] Date of Patent: Aug. 4, 1998

[54] MULTIPLEXING/DEMULTIPLEXING UNIT ARRANGED ON A MULTI-SURFACE INTEGRATED CIRCUIT

[75] Inventors: Karl Sven Magnus Buhrgard, Stockholm; Hao Jiang, Bandhagen, both of Sweden

[73] Assignee: Telefonaktiebolaget LM Ericsson, Stockholm, Sweden

[21] Appl. No.: 757,618

[22] Filed: Oct. 1, 1996

Related U.S. Application Data

[63] Continuation of Ser. No. 320,658, Oct. 11, 1994, abandoned.

[30] Foreign Application Priority Data

Oct. 12, 1993 [SE] Sweden ................................ 9303340

[51] Int. Cl.$^6$ ........................................................ H04J 3/22
[52] U.S. Cl. ........................ 370/391; 370/503; 370/535
[58] Field of Search ............................ 370/352, 357, 370/358, 359, 366, 368, 372, 375, 503, 360, 537, 538, 540, 535, 542–545; 327/407, 415, 433, 437, 391

[56] References Cited

U.S. PATENT DOCUMENTS

| | | | |
|---|---|---|---|
| 4,166,212 | 8/1979 | Judeinstein | 370/112 |
| 4,300,232 | 11/1981 | Kato | 370/112 |
| 4,656,620 | 4/1987 | Cox | 370/63 |
| 5,130,984 | 7/1992 | Cisneros | 370/60 |
| 5,198,684 | 3/1993 | Sudo | 257/79 |
| 5,327,422 | 7/1994 | Abefelt et al. | 370/63 |
| 5,365,519 | 11/1994 | Kozaki et al. | 370/60 |
| 5,414,698 | 5/1995 | Adams | 370/60 |
| 5,416,773 | 5/1995 | Gamm | 370/68 |

*Primary Examiner*—Chau Nguyen
*Attorney, Agent, or Firm*—Burns, Doane, Swecker & Mathis, L.L.P.

[57] ABSTRACT

The present invention relates to a multiplexing/demultiplexing unit constructed as an integrated circuit and as a block on a sub-surface of a silicon surface, such as a digital Bi-CMOS circuit and utilizing a CMOS section laid on said circuit, wherein a first sub-surface of a silicon surface carries a first array (41') of signal input and output circuits, and a second sub-surface carries a second array (41") of input and output circuits. A region (50) is located on the silicon surface between the first and the second sub-surfaces or located in some corresponding manner and is intended to carry control logic (51), memory stores (52), buffer circuits (53), synchronizing circuit arrangement (54) and the requisite conductors and functions to process signals, store signals and transmit the processed signals on selected output circuits both when multiplexing and demultiplexing signals.

13 Claims, 2 Drawing Sheets

MULTIPLEXING/DEMULTIPLEXING UNIT ARRANGED ON A MULTI-SURFACE INTEGRATED CIRCUIT

This application is a continuation, of application No. 08/320,658, filed Oct. 11, 1994, abandoned.

TECHNICAL FIELD

The present invention relates generally to a multiplexing/demultiplexing unit and more particularly, but not exclusively, to a multiplexing/demultiplexing block which is built-up on a silicon chip as an integrated circuit.

A number of such blocks may be built-up advantageously on a digital Bi-CMOS circuit, with each block utilizing a CMOS section incorporated in the circuit.

Multiplexing/demultiplexing blocks of this kind can be used either for multiplexing purposes, in which signals occurring on input connections at a given transmission rate occur with the same signal content on an output connection or output connections at a higher transmission rate, or for a demultiplexing purpose in which signals occurring on an input connection at a given high transmission rate occur with the same signal content on output connections at a lower transmission rate.

The available bandwidth for incoming information-carrying signals shall also correspond to the available bandwidth for outgoing information-carrying signals.

The invention is expected to find particular application for rate conversion when transporting or transmitting bit streams, coordinated to form data packets and then particularly data packets used in ATM techniques.

In conjunction herewith, it can be mentioned that a multiplexing/demultiplexing unit of this kind is intended for use in the optical transmission of signals in the form of light pulses, short distances within switching equipment, or between units in one and the same locality.

DESCRIPTION OF THE BACKGROUND ART

It is known to create selected rate conversion of bit streams occurring on one or more incoming connections to bit streams of corresponding content on one or more outgoing connections to and from a multiplexing and demultiplexing unit.

It is also known to apply on a silicon chip wafer or like silicon surface different layers to form on the surface a multiplexing circuit and a demultiplexing circuit of the aforesaid kind in the form of an integrated circuit.

With the intention of simplifying and rationalizing the manufacture of such circuits, it has been proposed that one circuit, the multiplexing circuit, is applied to one surface-part or region of the silicon chip and that the other circuit, the demultiplexing circuit, is applied to an adjacent surface-part or region on the silicon chip, and that the silicon chip input and output circuits and necessary circuits for multiplexing functions are applied on one surface region of the chip or wafer and that the corresponding circuits necessary for the demultiplexing functions are applied adjacent this one surface region, such that the integrated circuit produced will be complete for both functions.

It has been found that because of the compactness of this arrangement, it is not possible to use the two circuits simultaneously due to cross-talk phenomenon, and that, consequently, the circuits applied to different surface regions on the silicon chip, or silicon wafer, can only be used as either a multiplexing or a demultiplexing circuit, leaving essentially half the surface-part unused.

However, the advantage of this known technique is that a delimited sub-surface of a silicon chip can be used either as a multiplexing first circuit or as a demultiplexing second circuit.

With regard to one proposed application of the present invention, it can be mentioned that it is known to transmit sequential light pulses on an optical connection at a transmission rate within the Gb/s range, and the invention relates to an application in which the bit rate can exceed at least 1 Mb/s.

With regard to the proposed application of the present invention, it is known to attempt to minimize the number of electro-optical components, these components being relatively expensive and relatively unreliable, and to minimize the number of contact devices and cable volumes by increasing the bit rate on the optical connections used, particularly switch-internal optical connections.

In the case of such optical connections, it can be mentioned that a drive circuit is normally connected in the transmitter and the multiplexing unit is normally connected to a unit that is located externally of the switch equipment or switch devices that wish to transmit. Alternatively, an amplifier and the demultiplexing unit are normally coupled to a unit located externally of the switch equipment or the switch devices which are to receive transmitted signals.

DISCLOSURE OF THE PRESENT INVENTION

Technical Problems

When considering the present state of the art as described above, it will be seen that a technical problem resides in providing common sub-surfaces on a silicon chip or silicon wafer for the integrated circuit concerned within those sub-surfaces that are intended for the multiplexing circuit and those sub-surfaces that are intended for the demultiplexing circuit such that these circuits can be used irrespective of whether the circuit functions as a multiplexing circuit or as a demultiplexing circuit.

It will also be seen that a technical problem resides in selecting internal circuit arrangements suitable herefor, so that these circuit arrangements are able to form an "intermediate" or selected sub-surface which can be utilized by the multiplexing function when transmitting signals in one direction and by the demultiplexing function when transmitting signals in an opposite direction.

Another technical problem is one of realizing the significance of employing the aforesaid technical considerations when producing a multiplexing/demultiplexing unit on a silicon chip or like device, where one such unit is adapted to provide a conversion rate with the same signal content and the same bandwidth at bit rates above 150 Mb/s.

On the basis of a multiplexing/demultiplexing unit constructed as an integrated circuit, a technical problem would seem to reside in realizing that this circuit and/or a number of coacting circuits can be formed advantageously on a silicon carrier surface as a digital Bi-CMOS circuit, where each unit utilizes a CMOS section incorporated thereon.

Another technical problem is one of realizing the significance and the suitability of dividing the Bi-CMOS circuit into a number of blocks where each block has a first array of input and output circuits for data signals having a fast bit rate higher than 100 Mb/s, whereas a second array of data-signal input and output circuits is adapted for a second, higher bit rate.

In this regard, a technical problem resides in the ability to anticipate and to realize those advantages that are afforded by including on said CMOS section on a silicon-surface, surface-wise normally between said arrays of input and output circuits, a prepared intermediate or orientated subsurface which is intended to carry control logic, storage memories, buffer circuits, synchronizing circuit arrangements and the requisite conductors, this region or subsurface of the chip being intended for, processing signals while using a lower clock frequency, storing these signals and transmitting the stored signals through the medium of selected output circuits, irrespective of the current choice of multiplexing or demultiplexing of information-carrying bit positions.

It will also be seen that a technical problem resides in realizing the advantages afforded when the internal clock frequency is allowed to have a given relationship with the clock frequency or bit rate of the incoming and the outgoing signal, and also to realize that in the case of a standardized, low clock frequency or bit rate of 155 Mb/s for the incoming or the outgoing signals, the internal clock frequency should be adapted to about 30 Mb/s.

When the data cells are structured in accordance with an ATM system, another technical problem is one of realizing the particular advantages that are afforded when the ratio between the bit between the bit plate for the first array of input or output circuits and the selected bit rate for the internal signal processing is in the order of "four" or "five" or thereabouts.

It will also be seen that a technical problem is one of realizing the advantages that are afforded when a first input circuit is comprised of four channels having parallel-series converters with clock pulse conversion, and when a first output circuit is comprised of four channels which include a series-parallel converter with clock-pulse conversion, and that these channels are preferably positioned adjacent one another surface-wise.

Another technical problem resides in realizing the significance of constructing a second input circuit from a series-parallel converter with a clock pulse converter, and by constructing a second output circuit from a parallel-series converter with a clock pulse converter.

Another technical problem is one of realizing the significance of allowing the control logic to coact with a synchronizing circuit arrangement which controls the functions in the input and output circuits and in the memory, and the simplicity afforded thereby.

Still another technical problem resides in creating conditions whereby the input and output circuits can be adapted to receive an optical information-carrying signal, such as a signal having a sequential pulse pattern.

With regard to the use of multiplexing/demultiplexing units of the aforesaid kind that can be considered to solve one or more of the aforesaid technical problems and which are used in an opto-electric signal transmission system, it will be seen that a technical problem resides in realizing the significance of integrating certain function blocks which are otherwise included in an optical connection, such as an internal connection, with a multiplexing/demultiplexing unit, and then particularly with a unit which is adapted for a data packet system with the data packet structured in accordance with known ATM techniques.

It will also be seen that a technical problem is one of realizing those advantages that are afforded when certain of said function blocks are specific for the implementation of a given ATM switch, such as the precise bit rate, line code format, etc.

It will also be seen that a technical problem resides in realizing the advantages that are afforded by integrating those functions which are not required necessarily for optosignalling in the switch unit, therewith enabling the multiplexing/demultiplexing units used to be adapted and controlled in accordance with the ATM technique.

It will also be seen that a further technical problem resides in realizing the advantages that are afforded when certain function blocks are combined with certain functions in the multiplexing/demultiplexing units, or when the requisite clock pulse recovery can be effected separately from the multiplexing/demultiplexing units.

Another technical problem is one of realizing that monitoring an error indication of a link and/or a multiplexing/demultiplexing unit used is simpler and safer when the ATM level is found in the link, and that further integration can be effected in a readily adapted manner.

Solution

With the intention of solving one or more of the aforesaid technical problems, the present invention departs from a multiplexing/demultiplexing unit which is constructed as an integrated circuit and as a block on a sub-surface of a silicon chip, such as a digital Bi-CMOS circuit, and utilizing a CMOS section incorporated thereon, wherein a first sub-surface of a utilized silicon surface carries a first array of input and output circuits for signals allotted a first bit rate which is chosen to exceed 100 Mb/s, and wherein a second sub-surface carries a second array of input and output circuits for signals allotted a second bit rate.

In accordance with the invention, there is provided surfacewise between the first and second sub-surfaces which carry arrays of input and output circuits or at least sub-surfaces adjacent said first and second sub-surfaces, a region, such as a CMOS section, which is intended to carry control logic, memory stores, buffer circuits, synchronizing circuit arrangements and requisite conductors, said intermediate region being intended to process signals, store said signals and transmit the thus processed signals through selected output circuits, both when multiplexing and demultiplexing the signals.

According to further developments of the invention lying within the scope of the present invention, the synchronizing circuit arrangement is adapted to a clock frequency which is lower than the bit-rate value of the lowest bit rate occurring on the first or the second array of input or output circuits.

The clock frequency is preferably adapted to about 30 Mb/s.

The invention also relates to the use of a particular ratio between the bit rates, namely a bit ratio between a standardized, low bit rate for the first array of input or output circuits and a bit rate selected for the internal signal processing of "four", "five" or thereabouts.

According to another embodiment, a first input circuit is comprised of four channels which include a parallel-series converter with clock pulse converter, and a first output circuit is comprised of four channels which include a series-parallel converter with clock pulse converter, these channels being placed surface-wise adjacent one another.

According to another embodiment, a second input circuit may comprise a series-parallel converter with clock pulse conversion, and a second output circuit may comprise a parallel-series converter with clock pulse conversion.

According to one particularly preferred embodiment, the control logic shall be capable of coacting with a synchronizing circuit arrangement, among other things to control the functions in the input and output circuits and the memory store.

It has also been found possible to allow the input and output circuits to be adapted to receive an optical information-carrying signal with the aid of an allotted sequential pulse pattern.

Advantages

Those advantages primarily afforded by a multiplexing and/or a demultiplexing unit produced on a silicon surface such that the input and output circuits are located on a respective part-section and in which there is provided generally therebetween a part-section containing those circuits which can be used either to perform a multiplexing function or to perform a demultiplexing function reside in the ability to save silicon surface space in comparison with known techniques.

This enables a combined unit to be adapted directly for receiving or transmitting signal pulses occurring on an optical connection.

The use of a CMOS section and transistors enables the rate conversion to be effected selectively in both directions, and in each application or use there is used one and the same part-section containing internal control logic, memory set-ups and buffer circuits, etc.

When the multiplexing/demultiplexing units are constructed as an integrated circuit on a silicon surface on switch-internal boards, the function of these units can be checked or controlled by switch-internal routines, such as the routines applicable to ATM techniques, and the optical signal transmission system can be utilized irrespective of the transmission methodology utilized for the optical connection used.

The primary characteristic features of an inventive unit are set forth in the characterizing clause of the following claim 1.

BRIEF DESCRIPTION OF THE DRAWINGS

The present invention will now be described in more detail with reference to exemplifying embodiments thereof and also with reference to the accompanying drawings, in which.

DESCRIPTION OF EMBODIMENTS AT PRESENT PREFERRED

Figure 1:
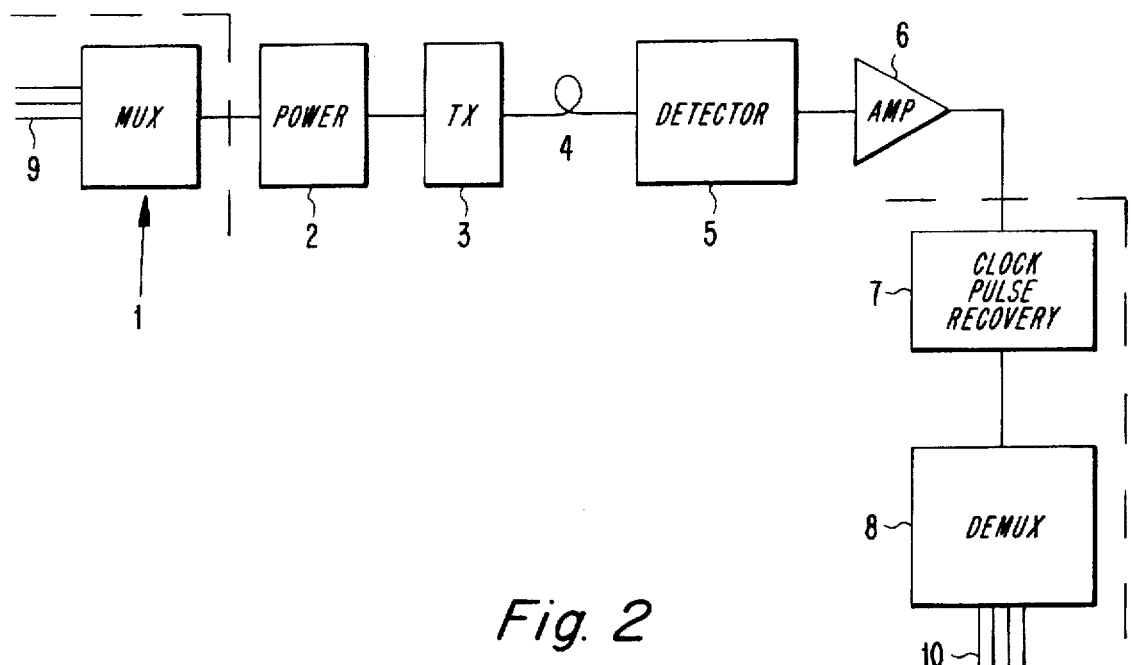
FIG. 1 illustrates a principle construction of a signal transmitting and signal receiving circuit where the bit positions of the signals occur as light pulses on an optical connection.

FIG. 1 illustrates a signal transmission system which includes a multiplexing unit 1., a power circuit 2 and a transmitter 3 which includes a laser diode for transmitting on an optical connection 4 light pulses which correspond sequentially with the bit positions on a connection 9 incoming to the unit 1.

The light pulses on the connection 4 are received by a detector 5 having an associated amplifier 6 and are coupled electrically to a clock pulse recovery circuit 7 and a demultiplexing unit 8 such as to lower the information rate on the signal bit positions from the unit 8 and transmit them on an outgoing connection 10.

The signal transmission system 1 includes on the one hand the aforesaid power circuit 2 and the transmitter 3 and on the other hand a receiver in the form of a detector 5 and an amplifier 6, and also includes the intermediate connection 4.

The multiplexing unit 1 and the demultiplexing unit 8 (and the clock pulse recovery circuit 7) are included in integrated circuits belonging to switch-internal boards or the like, and consequently these units can, advantageously, be the subject of a switch-internal check and adapted to the signal system used, etc.

The unit 1 is comprised of a signal receiving and a signal transmitting unit in both directions where only one direction is used and where received electrical signals occur on a number (four) of incoming lines 9 and where transmitted electric signals of higher rate are coupled to the power circuit 2.

The unit 8 is also comprised of a signal receiving and a signal transmitting unit in both directions and where only one direction is used, wherein received electrical signals are delivered from the clock pulse recovery circuit 7 at a high rate to an incoming connection, and wherein transmitted electrical signals of a lower rate are coupled to outgoing connections 10.

It is earlier known in the case of such signal transmission systems for a unit 1 on the silicon surface for the integrated circuit to include complete integrated circuits for increasing, multiplexing, decreasing, demultiplexing, the signal rate, although only a part of the complete integrated circuit that contains the multiplexing facility is used.

Similarly, it is also known for the unit 8 to include complete integrated circuits for both multiplexing and demultiplexing purposes, although only the complete part of the integrated circuit that includes the demultiplexing facility is used.

Figure 2:
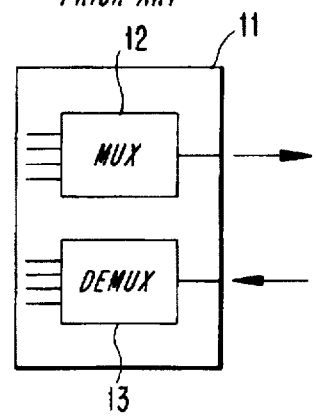
FIG. 2 illustrates an earlier known technique of forming on a silicon surface both a complete multiplexing surface formed on a sub-surface and a complete demultiplexing circuit formed on an adjacent sub-surface.

FIG. 2 illustrates schematically a known integrated circuit on a silicon surface of the kind intended here.

The silicon surface 11 includes a sub-surface 12 which is adapted for a complete multiplexing function, and a sub-surface 13 which is adapted for a complete demultiplexing function, wherein the sub-surface 12 can be used within the unit 1 whereas the sub-surface 13 can be used within the unit 8.

It will also be noted that the sub-surface 12 and the sub-surface 13 have mutually equivalent circuits for converting received signals, processing and handling received signals, storing the bit positions, and signal output circuits.

This method of providing circuits on a silicon surface requires an unnecessarily large silicon surface area of which only half is used for each selected application. It is also obvious that a high power is required.

Figure 3:
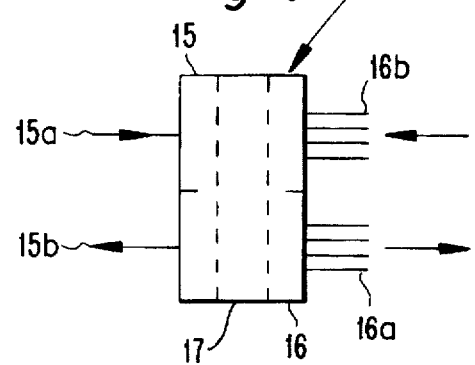
FIG. 3 illustrates the principle of treating a silicon surface in accordance with the present invention, wherein there is provided a sub-surface carrying first input or output circuits, a sub-surface carrying second input or output circuits and an intermediate sub-surface which carries circuits that can be commonly used for both multiplexing and demultiplexing purposes.

FIG. 3 illustrates the principle construction of a block on a silicon surface 14 in accordance with the invention.

It will be noted in this case that the inventive principles can be applied as a multiplexing/demultiplexing unit having a selected number of multiplexing/demultiplexing blocks, or as a unit comprised of one single block.

FIG. 3 illustrates the inventive principles wherein the first sub-surface 15 of a block carrying the integrated circuit is intended for an incoming connection 15a and an outgoing connection 15b, wherein a second sub-surface 16 is intended for a number, in this case four, incoming connections 16a and the same number of outgoing connections 16b, and wherein the arrangement also includes an intermediate sub-surface 17 which is intended for those circuits that are commonly required for a first or a second signal direction, i.e. for a multiplexing function or a demultiplexing function.

The bit positions that occur parallel on the four lines of the connection 16b occur serially on the line 15b at a rate which is four times greater than the rate on the connection 16b.

The bit positions that occur serially on the connection 15a occur in parallel on the four connection lines 16a at a speed which is four times lower than the speed on the connection 15a.

Should a circuit constructed on a silicon surface 14 in accordance with the invention be used in the unit 1, the upper part 16b of the sub-surface 16 would be connected to the connection 9, while the lower part 15b of the sub-surface 15 would be connected to the unit 2.

Should a circuit constructed on a silicon surface 14 in accordance with the invention be used in the unit 8, the upper part 15a of the sub-surface 15 would be connected to the unit 7, whereas the bottom part 16a of the sub-surface 16 would be connected to the four lines of the connection 10.

A common circuit arrangement is required for each of the aforesaid applications. This common circuit arrangement is shown positioned within the intermediate region 17, meaning that a much smaller part of the total silicon surface area is inactive when carrying out a chosen application, than in the case of the prior art solution.

Figure 4:
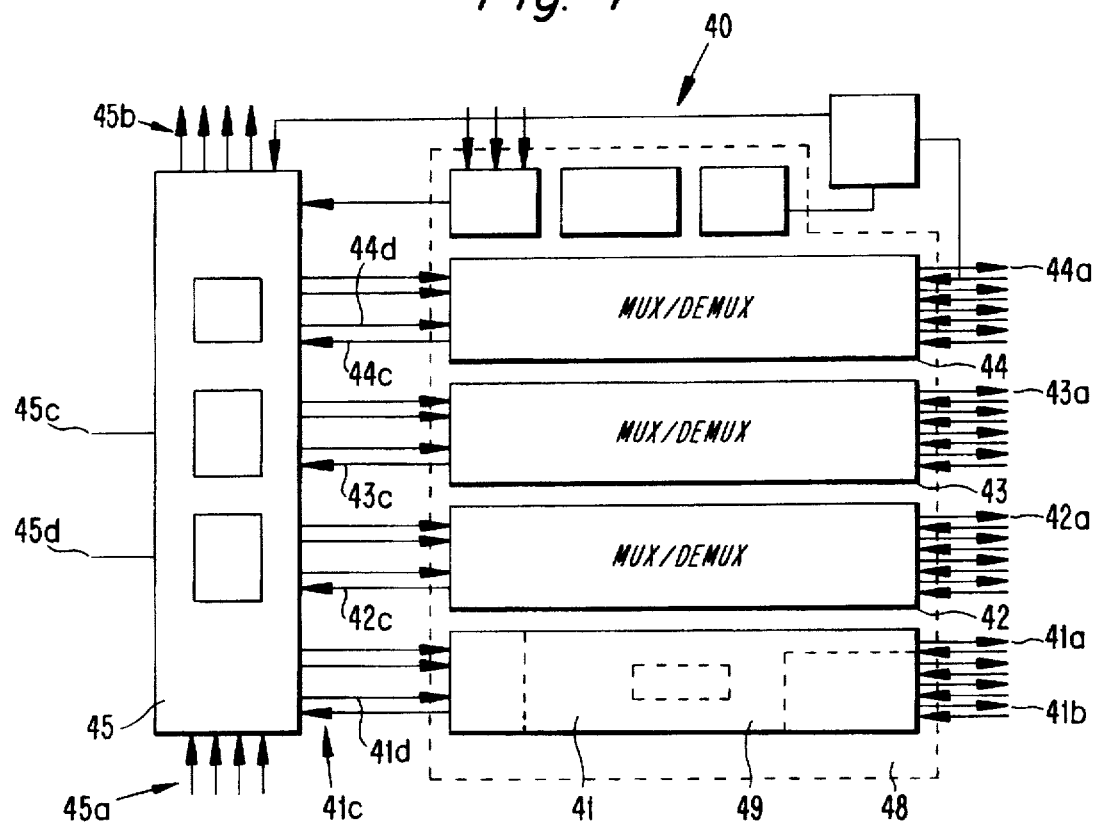
FIG. 4 is a block schematic illustrating the principle construction of a multiplexing or demultiplexing unit in accordance with the invention, this unit being integrated in a Bi-CMOS circuit.

FIG. 4 illustrates a further development of the embodiment illustrated schematically in FIG. 3, the circuit arrangement of this further development having a rate conversion of a factor of "four".

Thus, this unit includes four sections or blocks 41, 42, 43, 44 arranged parallel to one another, and a fifth block 45 which is positioned transversely. Each of the sections or blocks 41–44 have four incoming lines, such as 41a, and commonly four outgoing lines, such as lines 41c, 42c, 43c and 44c, which pass to the block 45. The block 45 has an outgoing line 41d to the block 41, and so on.

The block 45 also includes four incoming lines 45a, four outgoing lines 45b, one incoming line 45c and one outgoing line 45d, these lines being externally accessible.

The rate conversion between signals occurring on four lines 41a and the line 41c, or the line 45b, has a factor of four, the rate conversion between signals occurring on one of the four lines 41c, 42c, 43c and 44c, or one (45a) of the four lines and the line 45d has a factor of four.

More specifically, the unit 40 is constructed to be able to receive signals on sixteen incoming lines, such as lines 41a, 42a, 43a, 44a, at a bit rate of 155 Mb/s, and to increase this bit rate to 622 Mb/s on the four block-internal lines 41c, 42c, 43c and 44c (alternatively take out via outgoing lines 45b), and to transpose the signals on the four lines 41c, 42c, 43c and 44c or on one (45a) of four connections up to a series bit rate of 2.5 Gb/s on the outgoing line 45d.

Correspondingly, the unit 40 functions to reduce bit speeds in an opposite direction by a factor of four from serial signals on the line 45c to parallel signals on the four lines 45b, or on the four internal lines 41d–44d, and/or to parallel signals on the sixteen lines, of which one of four lines has been referenced 41b, this line being intended for block 41.

As the blocks 41–44 and 45 can be considered to be mutually identical and each is controlled and functions in the same way as the other, the following description will refer only to the block 41.

Figure 5:
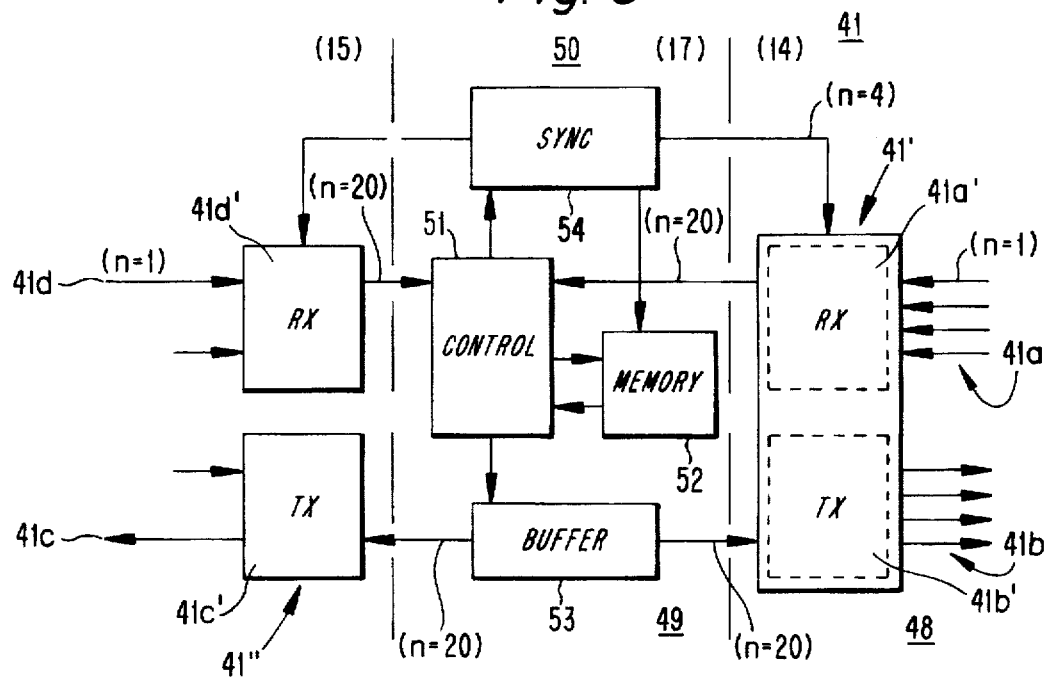
FIG. 5 is a block schematic illustrating a multiplexing or demultiplexing block having CMOS transistors.

FIG. 5 is a block schematic which illustrates a single multiplexing/demultiplexing block 41 constructed as an integrated circuit on a digital Bi-CMOS circuit 48 and utilizes a CMOS section 49 laid on the circuit 48.

The sub-block 41 has a first array 41' of signal input and output circuits, said signals having a first bit rate greater than 100 Mb/s, and a second array 41" of input and output circuits for signals that have a second, higher bit rate and occur on the lines 41c and 41d respectively.

The remaining sub-blocks 42–45 include corresponding input and output circuits.

The first array 41' of input and output circuits includes signal receiving 41a' and signal transmitting 41b' units, and the second array 41" of input and output circuits includes signal receiving 41d' and signal transmitting 41c' units.

Located on the CMOS section between the first and the second arrays 41' and 41" of input and output circuits is an intermediate region 50 which is intended to receive a control logic 51, the requisite memory store 52, a buffer circuit 53, a synchronizing circuit arrangement 54 and the necessary conductors, said region 50 being primarily intended to process the signals, store the signals and transmit the processed signals via selected output circuits within the first array 41' or selected output circuits within the second array 41".

The synchronizing circuit arrangement 54 is adapted for a clock frequency which is lower than the bit rate of the signal having the lowest bit rate and entering the input circuit 41'.

The internal clock frequency is preferably adapted to about 30 Mb/s.

The invention enables the first array 41' to include a first input circuit 41a' which is comprised of four channels which include parallel-series converter, and a first output circuit 41b' which is comprised of four channels that include a series-parallel converter with requisite clock pulse conversion, these channels being positioned adjacent one another on the silicon surface.

The invention also enables the second array 41" to include a second input circuit 41d' which includes a series-parallel converter with clock pulse conversion, and a second output circuit 41c' which comprises a parallel-series converter with clock pulse conversion.

The control logic 51 coacts with synchronizing circuit arrangement 54 controlling the functions in the input and output circuits 41a', 41b' and 41d', 41c', and in the memory store 52.

If the embodiment illustrated in FIGS. 4 and 5 is applied on the signal transmitting and signal receiving circuit illustrated in FIG. 1, the four incoming lines 9 could be corresponded by the inputs 45a, wherein the outgoing line 45d would be connected to the power unit 2.

In the case of the unit 8, the line from the circuit 7 could be corresponded by the line 45c and the four outgoing lines 10 could be corresponded by the four lines 45b.

The line 9 could also be corresponded by sixteen incoming lines, of which one line of four has been referenced 41a, wherein the line to the power circuit could be corresponded by the four internal lines 41c, 42c, 43c and 44c, or preferably by the corresponding externally accessible four lines 45b.

A circuit set-up of this kind can be used advantageously with a unit described and illustrated in the patent application filed at the same time as the present application and entitled "A Signal Receiving and Signal Transmitting Unit" or with a unit described and illustrated in a patent application filed at the same time as the present application and entitled "A Signal Processing Unit" or with an arrangement described and illustrated in a patent application filed at the same time as the present application and entitled "A Synchronizing Circuit Arrangement".

Reference is made to these patent applications for a deeper understanding of the application of the present invention and the contents of these patent applications shall be considered to form part of the present application.

It will be understood that the present invention is not restricted to the aforedescribed and illustrated exemplifying embodiment thereof and that modifications can be made within the scope of the inventive concept as defined in the following claims.

We claim:

1. A multiplexing/demultiplexing unit constructed as an integrated circuit of a silicon surface, comprising:

a first sub-surface of the silicon surface including a first array of signal input and output circuits;

a second sub-surface of the silicon surface including a second array of input and output circuits; and a region located on the silicon surface substantially between the first and the second sub-surfaces, the region including control logic, memory, buffer circuits, a synchronizing circuit arrangement and conductors, wherein the region processes input signals, stores said processed signals, and transmits the processed signals on selected output circuits, to perform one of multiplexing and demultiplexing of said input signals, wherein an input circuit of the first array is comprised of four channels which include a parallel-series converter, and an output circuit of the second array is comprised of four channels which include a series-parallel converter, the channels being placed adjacent one another.

2. A unit according to claim 2, wherein the synchronizing circuit arrangement is adapted for a bit rate that is lower than a lowest bit rate of a signal occurring on the first or the second array of input and output circuits.

3. A unit according to claim 2, wherein the bit rate is adapted to about 30 Mb/s.

4. A unit according to claim 2, characterized in that a bit rate is adapted to about 30 Mb/s.

5. A unit according to claim 1, wherein a ratio between a lowest bit rate for a first array of input or output circuits and a selected bit rate for an internal signal processing operation is within a range of 4-5.

6. A unit according to claim 1, wherein the control logic coacts with the synchronizing circuit arrangement to control the functions in the input and the output circuits and in the memory.

7. A unit according to claim 1, wherein the input and the output circuits are adapted to receive an electro-optical information-carrying signal through the medium of a sequential pulse pattern.

8. A multiplexing/demultiplexing unit constructed as an integrated circuit of a silicon surface, comprising:

a first sub-surface of the silicon surface including a first array of signal input and output circuits;

a second sub-surface of the silicon surface including a second array of input and output circuits; and a region located on the silicon surface substantially between the first and the second sub-surfaces, the region including control logic, memory, buffer circuits, a synchronizing circuit arrangement and conductors, wherein the region processes input signals, stores said processed signals, and transmits the processed signals on selected output circuits, to perform one of multiplexing and demultiplexing of said input signals, wherein an input circuit of the first or second arrays is comprised of a series-parallel converter for clock pulse conversion, and an output circuit of the first or second arrays is comprised of a parallel-series converter for clock pulse conversion.

9. A signal transmitting system including multiplexing/demultiplexing units constructed as integrated circuits of a silicon surface including a first and second sub-surfaces having first and second arrays of signal input and output circuits and a region located substantially between the first and second subsurfaces of each unit, the region including control logic, memory, buffer circuits, a synchronizing circuit arrangement and conductors, wherein the region processes input signals, stores said processed signals, and transmits the processed signals on selected output circuits, comprising:

a transmitter including a first of said multiplexing/demultiplexing units for multiplexing an input signal;

an optical transmitting medium connected between the transmitter and a receiver; and a receiver including a second of said multiplexing/demultiplexing units for demultiplexing a received signal, wherein an input circuit of the first array is comprised of four channels which include a parallel-series converter, and an output circuit of the second array is comprised of four channels which include a series-parallel converter, the channels being placed adjacent one another.

10. A system according to claim 9, wherein the multiplexing/demultiplexing units are included in a switch-internal monitoring and signal processing system according to a switch-internal signalling system.

11. A multiplexing/demultiplexing unit constructed as an integrated circuit on a silicon surface comprising:

a first sub-surface of the silicon surface including a first array of signal input and output circuits allotted for signals having a first bit rate;

a second sub-surface of the silicon surface including a second array of signal input and output circuits allotted for signals having a second bit rate;

a region located on the silicon surface between the first and second sub-surfaces including at least a control circuit, a memory circuit, a buffer circuit, a synchronizing circuit such that the region processes and stores the signals and transmits the processed signals on selected output circuits to provide multiplexing and demultiplexing of the signals, wherein an input circuit of the first array is comprised of a plurality of channels which include a parallel-series converter, and an output circuit of the second array is comprised of a plurality of channels which include a series-parallel converter, the channels being placed adjacent one another.

12. The unit of claim 11, wherein the region located between the first sub-surface and second sub-surface is a CMOS section enabling rate conversion to be selected in either direction between the first sub-surface and the second sub-surface.

13. The unit of claim 11, wherein no cross talk occurs between the first sub-surface and the second sub-surface allowing the unit to both multiplex signals and demultiplex signals in either direction between the first sub-surface and the second sub-surface.

* * * * *